United States Patent
Tripp et al.

(10) Patent No.: US 9,372,076 B2
(45) Date of Patent: Jun. 21, 2016

(54) SYSTEM AND METHOD FOR AUTOMATED PIPE MEASUREMENT AND ALIGNMENT

(71) Applicant: Tri Tool Inc., Rancho Cordova, CA (US)

(72) Inventors: Justin Peter Tripp, Rancho Cordova, CA (US); Anthony Ray LeMaster, Rancho Cordova, CA (US)

(73) Assignee: TRI TOOL INC., Rancho Cordova, CA (US)

( * ) Notice: Subject to any disclaimer, the term of this patent is extended or adjusted under 35 U.S.C. 154(b) by 0 days.

(21) Appl. No.: 14/679,778

(22) Filed: Apr. 6, 2015

(65) Prior Publication Data

US 2015/0292872 A1    Oct. 15, 2015

Related U.S. Application Data

(60) Provisional application No. 61/977,777, filed on Apr. 10, 2014.

(51) Int. Cl.
*G01B 11/24*      (2006.01)
*G01B 11/12*      (2006.01)
(Continued)

(52) U.S. Cl.
CPC ............... *G01B 11/24* (2013.01); *G01B 11/12* (2013.01); *G01B 11/14* (2013.01); *G05B 19/4145* (2013.01); *G05B 2219/33099* (2013.01); *G05B 2219/39443* (2013.01)

(58) Field of Classification Search
CPC ........ G01B 11/00; G01B 11/14; G01B 11/24; G01B 11/12; G05B 19/4145; G05B 2219/33099; G05B 2219/39443

USPC ................................................... 700/166, 168
See application file for complete search history.

(56) References Cited

U.S. PATENT DOCUMENTS

| 4,400,118 A | * | 8/1983 | Yamakage | ........ B23B 29/03457 |
| | | | | 318/571 |
| 4,403,860 A | | 9/1983 | Pryor | |
| 5,446,549 A | * | 8/1995 | Mazumder et al. | ........... 356/613 |

(Continued)

FOREIGN PATENT DOCUMENTS

| CN | 102589456 A | 7/2012 |
| JP | H-1151635 A | 2/1999 |

(Continued)

OTHER PUBLICATIONS

International Search Report from Corresponding International PCT Application No. PCT/US2015/024612, Jun. 24, 2015.

*Primary Examiner* — Kenneth M Lo
*Assistant Examiner* — Michael J Huntley
(74) *Attorney, Agent, or Firm* — Workman Nydegger (57) ABSTRACT

A method of aligning a portable machining system to a pipe end portion includes automatically moving a measurement sensor mounted to the portable machining system about the pipe end portion in a first measurement plane to generate a first set of measurement data. The method includes translating the measurement sensor from the first measurement plane to a second measurement plane. The method includes automatically moving the measurement sensor about the pipe end portion in the second measurement plane to generate a second set of measurement data and processing the first and second sets of measurement data with a processing module to determine a center and an axis of the pipe end portion.

20 Claims, 9 Drawing Sheets

(51) Int. Cl.
*G01B 11/14* (2006.01)
*G05B 19/414* (2006.01)

(56) References Cited

U.S. PATENT DOCUMENTS

| | | | | |
|---|---|---|---|---|
| 6,052,911 | A * | 4/2000 | Davis | 33/286 |
| 6,189,425 | B1 * | 2/2001 | Ricci et al. | 82/113 |
| 6,289,600 | B1 * | 9/2001 | Watts | 33/542 |
| 6,949,056 | B2 | 9/2005 | Soroka et al. | |
| 7,310,890 | B2 * | 12/2007 | Cattaneo et al. | 33/543 |
| 8,083,444 | B2 * | 12/2011 | Schawe | 409/66 |
| 8,087,857 | B2 | 1/2012 | Schawe | |
| 8,250,952 | B2 | 8/2012 | Maxted et al. | |
| 8,550,444 | B2 * | 10/2013 | Nygaard et al. | 269/275 |
| 8,601,917 | B2 * | 12/2013 | Schreiber | 82/1.11 |
| 2002/0138995 | A1 * | 10/2002 | Dameron | 33/286 |
| 2005/0204879 | A1 | 9/2005 | Kwech et al. | |
| 2011/0238199 | A1 * | 9/2011 | Bonadeo | G01B 11/2425 700/109 |
| 2011/0299033 | A1 * | 12/2011 | Wada | 351/204 |
| 2012/0039679 | A1 * | 2/2012 | Kundracik | B23G 1/225 408/1 R |
| 2012/0074205 | A1 * | 3/2012 | Dagenais | 228/102 |
| 2013/0160309 | A1 | 6/2013 | Logan et al. | |
| 2013/0229667 | A1 * | 9/2013 | Goeing et al. | 356/612 |
| 2013/0283628 | A1 * | 10/2013 | Topueth et al. | 33/550 |
| 2014/0299376 | A1 * | 10/2014 | Bertelsen | 175/24 |
| 2014/0355403 | A1 * | 12/2014 | Kishigami et al. | 369/47.49 |
| 2015/0002836 | A1 * | 1/2015 | Baba et al. | 356/72 |
| 2015/0009322 | A1 * | 1/2015 | Baba et al. | 348/135 |
| 2015/0015873 | A1 * | 1/2015 | Baba et al. | 356/153 |
| 2015/0116728 | A1 * | 4/2015 | Lacome et al. | 356/601 |
| 2015/0131109 | A1 * | 5/2015 | Baba et al. | 356/635 |
| 2015/0204798 | A1 * | 7/2015 | Nygaard et al. | 356/237.2 |

FOREIGN PATENT DOCUMENTS

| | | |
|---|---|---|
| JP | 2010-101731 A | 5/2010 |
| JP | 2013-242292 A | 12/2013 |

* cited by examiner

| Automatically Moving a Measurement Sensor mounted to a Spindle of the Portable Machining System about a Pipe End Portion in a First Measurement Plane to Generate a First Set of Measurement Data associated with the Pipe End Portion | 200 |

↓

| Translating the Measurement Sensor relative to a Length of the Pipe End Portion from the First Measurement Plane to a Second Measurement Plane | 300 |

↓

| Automatically Moving the Measurement Sensor about the Pipe End Portion in the Second Measurement Plane to Generate a Second Set of Measurement Data associated with the Pipe End Portion | 400 |

↓

| Processing the First Set of Measurement Data and the Second Set of Measurement data with a Processing Module to Determine a Center and an Axis of the Pipe End Portion | 500 |

SYSTEM AND METHOD FOR AUTOMATED PIPE MEASUREMENT AND ALIGNMENT

TECHNICAL FIELD

The disclosure relates to a system and method for automated pipe measurement and alignment.

BACKGROUND

In any precision machining operation, precise alignment to and measurement of a work piece, such as a pipe, is crucial to performing a quality machining operation. Regardless of how precise and accurate the movement and control of the machine is, if one cannot accurately place the orientation of the machine to the work piece, the job cannot be performed correctly. This is especially true for field counter boring of pipelines using portable equipment that is designed to operate in a wide variety of working conditions (e.g. on a desert gravel bed, in a sea container on an oil platform, in a pipe yard, etc.). Usually, such portable equipment is machining the inner diameter ("ID") bore on only a small area of the pipe, thereby making the portable equipment even more sensitive to improper alignment.

One conventional type of measuring and alignment system includes measuring and aligning the machine to a pipe end using a dial indicator (analog or digital). In general, a dial indicator is temporarily mounted to the boring bar of the machine by an operator such that the dial indicator contacts the outer diameter ("OD") of the pipe end. The operator then rotates the dial indicator around the pipe end in multiple planes. As the operator is rotating the dial indicator, the operator must be able to read and record displacement output from the dial indicator.

The operator then uses a calculator or spreadsheet to determine what movements to the pipe and/or the machine are needed such that the dial indicator no longer moves when the operator is rotating the dial indicator around the pipe. This is an iterative process that can take several rounds of measurements before the operator can achieve the desired alignment of the machine to the pipe end. First, every time the operator moves the pipe or the machine there are new process variables that must be accounted for. For instance, the operator may be setting up the machine on gravel where the elevation can change from one position to the next. Second, the operator must account for two different modes that affect one another. One, the operator must get the portable machining system on center with the pipe end. Two, the operator must get the axis of the portable machining system parallel to the axis of the pipe end.

Typically, the operator first tries to get as close to parallel as possible with the dial indicator. Then, the operator addresses the X, Y, on center position of the portable machining system. A highly skilled operator may be able to sweep for parallelism, adjust the X, Y position of the portable machining system, and then perform one more sweep with the dial indicator for parallelism. An operator who is not as experienced will have to jump back and forth between the two modes two or three times before they are able to get both modes right.

Conventional measuring and alignment systems and methods such as these tend to suffer from a number of drawbacks. For instance, such systems and methods can be very labor intensive and require extensive and specialized operator training. In addition, such systems and methods are prone to operator error and can be inconsistent from one operator or dial indicator to another. Moreover, the cycle times of such systems and methods to align a machining system to a pipe end are generally very long. Further, dial indicators typically have limited accuracy limits and measurement ranges.

In view of the shortcomings of conventional systems and methods, there exists a substantial need for a system and a method to align a machining system to a work piece that is more consistent, faster, less labor intensive, and provides higher accuracy.

SUMMARY

According to a method of aligning a portable machining system to a pipe end portion, the method includes automatically moving a measurement sensor mounted to the portable machining system about a pipe end portion in a first measurement plane to generate a first set of measurement data. The method includes translating the measurement sensor from the first measurement plane to a second measurement plane. The method includes automatically moving the measurement sensor about the pipe end portion in the second measurement plane to generate a second set of measurement data and processing the first and second sets of measurement data with a processing module to determine a center and an axis of the pipe end portion.

Automatically measuring the pipe end portion with the measurement sensor and portable machining system has the effect of eliminating operator error and does not require extensive and specialized operator training, as in the prior art. For instance, it eliminates the need for an operator to constantly monitor and record displacement data from a dial indicator, which, in turn, substantially reduces the time to align the system 100 to a pipe. Moreover, this automated approach is more consistent than in the prior art where dial indicators and/or operator errors can introduce inconsistencies in the measurement of the pipe. There is no longer the risk of an operator incorrectly reading the output from a dial indicator.

It also advantageously is faster, more accurate and more consistent than conventional systems and methods.

According to a variation, the method includes the step of automatically aligning a spindle of the portable machining system to the pipe end portion based on the determined center and axis of the pipe end portion. This alignment is automatic and based on feedback from the measurement sensor rather than manual positioning and repositioning of the machining system as in the prior art, allowing it to be performed quickly and virtually anywhere such as on an oil platform, a concrete floor, an asphalt surface, or another underlying surface. This advantageously provides a user with significant freedom.

Additional features and advantages of embodiments of the present disclosure will be set forth in the description that follows, and in part will be obvious from the description, or may be learned by the practice of such exemplary embodiments. These and other features will become more fully apparent from the following description and appended claims, or may be learned by the practice of such exemplary embodiments as set forth.

BRIEF DESCRIPTION OF THE DRAWINGS

These and other features, aspects, and advantages of the present disclosure will become better understood regarding the following description, appended claims, and accompanying drawings.

DETAILED DESCRIPTION OF VARIOUS EMBODIMENTS

A better understanding of different embodiments of the disclosure may be had from the following description read with the accompanying drawings in which like reference characters refer to like elements.

While the disclosure is susceptible to various modifications and alternative constructions, certain illustrative embodiments are in the drawings and are described below. It should be understood, however, there is no intention to limit the disclosure to the specific embodiments disclosed, but on the contrary, the intention covers all modifications, alternative constructions, combinations, and equivalents falling within the spirit and scope of the disclosure.

It will be understood that unless a term is expressly defined in this patent to possess a described meaning, there is no intent to limit the meaning of such term, either expressly or indirectly, beyond its plain or ordinary meaning.

The machining system described is configured for machining the ID of a pipe and measuring the OD of the pipe. It should be remembered, however, that the same concepts and methods described may be similarly used for other machining systems and are not limited solely to machining the ID of a pipe and measuring the OD of the pipe. For instance, the same concepts and methods describe may be used in machining systems for machining the OD of a pipe and measuring the ID of the pipe and/or the OD of the pipe. Moreover, while the machining system is described in use with a pipe, it will be appreciated that machining system can be used with any suitable work piece and is not limited to pipes.

Any element in a claim that does not explicitly state "means for" performing a specified function, or "step for" performing a specific function is not to be interpreted as a "means" or "step" clause as specified in 35 U.S.C. §112, paragraph 6.

Figure 1A:
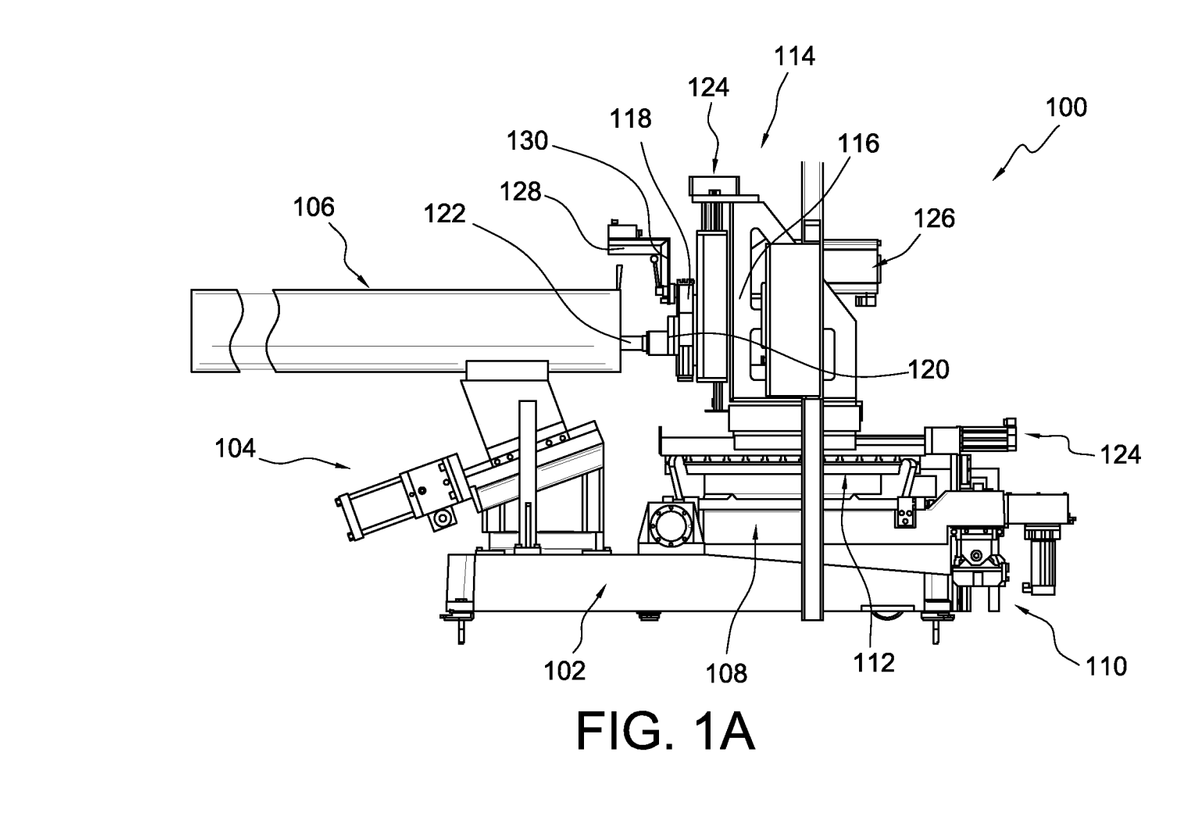
FIG. 1A is a side view of a field machining system according to an embodiment.

FIG. 1A illustrates a portable machining system 100 according to an embodiment of the disclosure. As described in more detail below, the system 100 solves the problem of pipe measurement and alignment being too time consuming, labor intensive, error prone, and complex. The system can automatically measure the profile of a pipe end portion using a measurement sensor and automatically align itself to the pipe end portion based on data derived from the measurement sensor. This has the effect of eliminating operator error and does not require extensive and specialized operator training, as in the prior art. This also advantageously is faster, more accurate, and more consistent than conventional systems and methods.

The portable machining system can comprise a computer numerated control ("CNC") machining system or any other suitable machining system. The system 100 generally comprises a base 102 configured to rest on an underlying surface. The underlying surface can be an oil platform, a concrete floor, an asphalt surface, a gravel surface, asphalt or another appropriate underlying surface. A pipe support 104 can be positioned on the base 102. The pipe support 104 can be configured to receive and support an end portion of a pipe 106. The end portion of the pipe 106 can be loaded and secured, and/or hooked on the pipe support 104. The pipe support 104 can be movable relative to the base 102 and can be customizable for different size piping. The pipe support 104 can be configured to move the secured end of the pipe 106 relative to the base 102.

A tilt base 108 can be pivotally connected to the base 102. A drive system 110 can be operably connected to the tilt base 108 and configured to selectively rotate the tilt base 108 about an A-Axis (shown in FIG. 2). The drive system 110 is shown being mounted toward the rear of the base 102, however, it will be appreciated that it can be mounted in any suitable location. The drive system 110 can be driven by one or more suitable motors. For example, the motor can comprise a servomotor and/or can include an encoder, driver electronics, and/or motor protection circuitry inside of a motor housing. The motor can be operably coupled to the encoder for position and/or speed feedback. A controller or driver can utilize feedback from the encoder to precisely control the motion and position of the motor, which in turn can precisely control movement of the tilt base 108.

A rotary table 112 can be positioned on the tilt base 108. When the drive system 110 rotates the tilt base 108 about the A-Axis, the rotary table 112 rotates about the A-Axis with the tilt base 108. A drive system can be operably connected to the rotary table 112 and configured to selectively rotate the rotary table 112 about a B-Axis (shown in FIG. 2). Similar to the drive system 110, the drive system can include one or more motors configured to precisely control movement of the rotary table 112.

Figure 2:
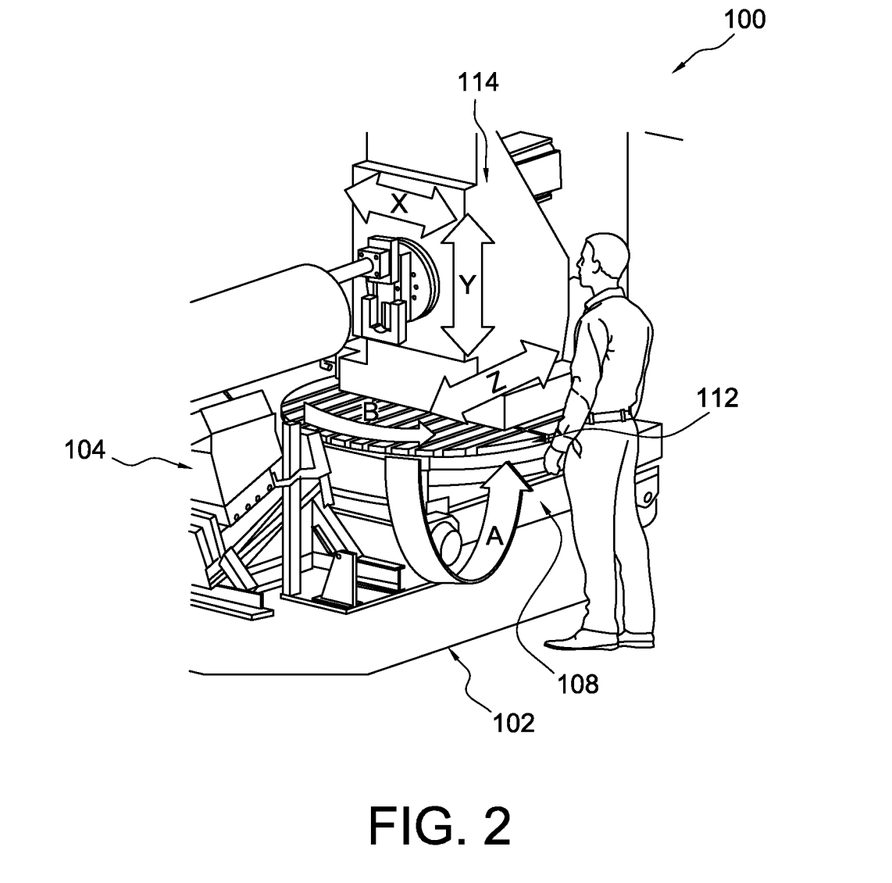
FIG. 2 is partial isometric view of the field machining system shown in FIG. 1A.

A spindle system 114 can be positioned on the rotary table 112. The spindle system 114 can include a support frame 116, a housing and a rotatable spindle 118. When the drive system 110 rotates the tilt base 108 about the A-Axis, the rotary table 112 rotates about the A-Axis, which, in turn, causes the spindle system 114 to rotate about the A-Axis. When the drive system of the rotary table 112 rotates the rotary table 112 about the B-Axis, the spindle system 114 rotates with the rotary table 112 about the B-Axis.

A drive system 124 can be operably connected to the spindle system 114 and configured to selectively move and/or position the spindle system 114. For instance, the drive system 124 can be configured to translate the spindle 118 along a Z-axis (shown in FIG. 2). The Z-Axis can be linear and generally parallel to the axis of the spindle 118. The drive system 124 can also be configured to translate the spindle 118 along an X-Axis (shown in FIG. 2) and a Y-Axis (shown in FIG. 2). The X-Axis can be linear and perpendicular to the Z-Axis and the Y-Axis can be linear and perpendicular to both the Z-Axis and the X-Axis. Similar to the drive system 110, the drive system 124 can include one or more motors configured to precisely control movement of one or more components of the spindle system 114.

Referring again to FIG. 1A, a radial movement mechanism 120 can be connected to a face of the spindle 118 such that the radial movement mechanism 120 rotates with the spindle 118 during use. The radial movement mechanism 120 can be configured to radially advance toward or away from the pipe 106 as desired and to react against radial cutting forces during a machining operation. A boring or cutting bar 122 configured to hold a tool bit 123 (shown in FIG. 3) can be supported by the radial movement mechanism 120.

At least one measurement sensor 128 can be attached to the face of the spindle 118. The measurement sensor 128 can comprise a contact sensor or a non-contact sensor 128 arranged to measure one or more characteristics of the pipe 106 without physically contacting the pipe 106. Preferably, the measurement sensor is a laser displacement sensor 128 arranged to measure the profile of the pipe 106 using displacement, distance, and/or angle measurements. While a laser displacement sensor is referenced, it will be appreciated that the measurement sensor 128 can comprise magnetic sensors, ultrasound sensors, radio frequency sensors, encoders, transducers, capacitive sensors, eddy current sensors, inductive sensors, magneto-inductive sensors, position and/or displacement sensors, imaging detectors, electromagnetic energy sensors, combinations thereof, or any other suitable sensor.

The laser displacement sensor 128 can be attached to the face of the spindle 118 in any suitable manner. For instance, the laser displacement sensor 128 can be mounted on a removable bracket 130 on the face of the main spindle 118. Optionally, the laser displacement sensor 128 and the bracket 130 can be stored in a cradle of the spindle 118. In some embodiments, the laser displacement sensor can be directly attached to the face of the spindle 118 or permanently attached to the face of the spindle 118.

Figure 1B:
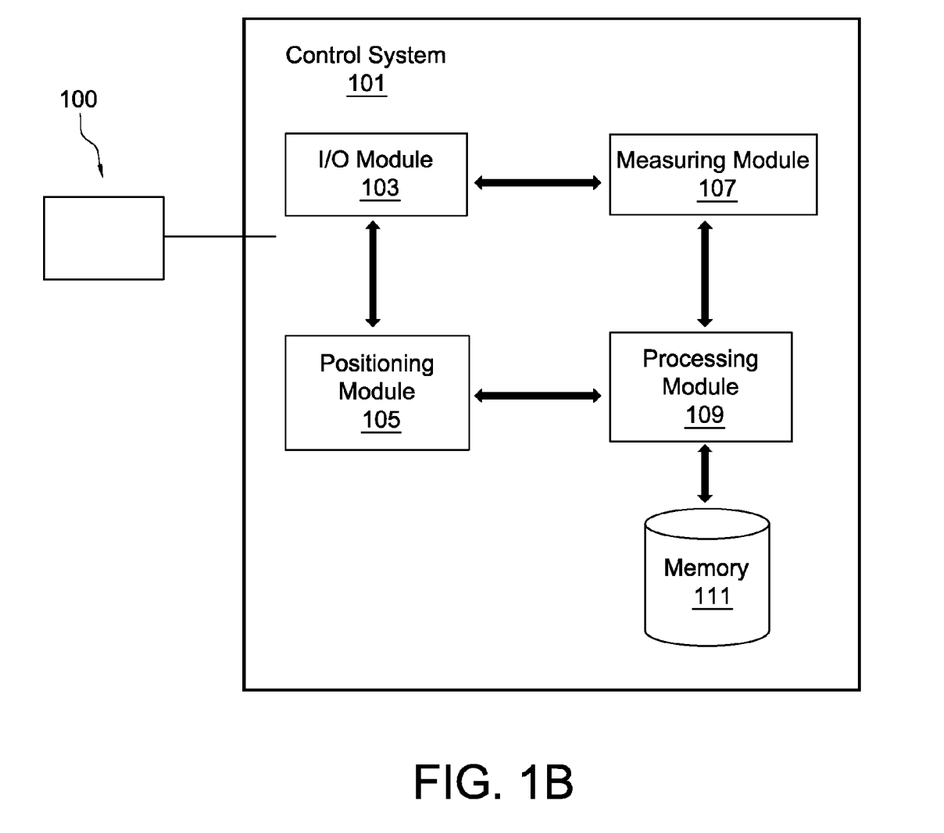
FIG. 1B is an architectural schematic diagram of a control system.

Referring now to FIG. 1B, a control system 101 can be associated with the system 100. The control system 101 can be operable to control operation of one or more of the foregoing system components (e.g., drive system 110, drive system 124, drive system 126, pipe support 104, laser displacement sensor 128, etc.). The control system can be internal to or external to the system 100. The control system 101 may be programmable for aligning the system 100 to the secured end of the pipe 106 and/or tailoring operation of the system 100.

The control system 101 can comprise or can be operably coupled to a computer system. The computer system can be a personal computer, a desktop computer, a laptop computer, a message processor, a hand-held device, a multi-processor system, a microprocessor-based or programmable consumer electronics device, a network PC, a minicomputer, a mainframe computer, a smart phone, a PDA, a tablet, combinations thereof, or the like.

The control system 101 can include an I/O module 103. The I/O module 103 can communicate with the system 100, a user, other modules of the control system 101, and/or other computer systems. Through the I/O module 103, a positioning module 105 can direct different components of the system 100 to move. Upon positioning of the system 100, a measurement module 107 can direct the laser displacement sensor 128 to measure the pipe 106 and can receive data from the laser displacement sensor 128. A processing module 109 can execute computer executable instructions and/or process operational data. The processing module 105 may be operably coupled to a memory 111.

The memory 111 can store an application including computer executable instructions, measurement data, and/or operational data constituting a program to perform certain acts (e.g., a part program, a software control program, etc.). For example, the processing module 109 may be operably coupled to a memory 111 storing an application including computer executable instructions and data constituting a customized program to measure the secured end of the pipe 106 and align the spindle 118 of the system 100 to the secured end of the pipe 106.

The memory 111 may be embodied as a computer readable medium, such as a random access memory ("RAM"), a hard disk drive, or a static storage medium such as a compact disk, DVD, or the like. The memory 111 may further store property data describing properties of a pipe and/or machining operation. The computer system may further include a display coupled to the I/O module 103. In an embodiment, the computer system can be integral to the control system 101. In other embodiments, the computer system can be external to the control system 101.

Figure 3:
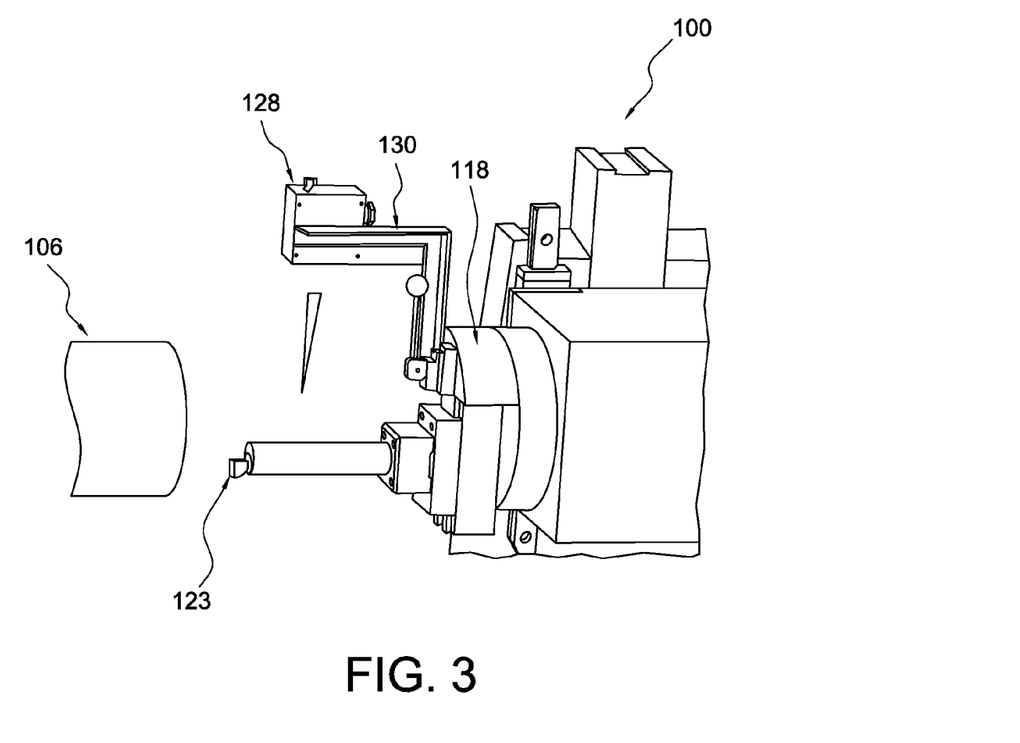
FIG. 3 is a detailed partial isometric view of the field machining system shown in FIG. 1A.

Referring now to FIGS. 3-7, an automated measuring and alignment routine or application of the system 100 will now be described according to an embodiment. First, the laser displacement sensor 128 can be installed on the face of the spindle 118 as shown in FIG. 3.

Figure 4:
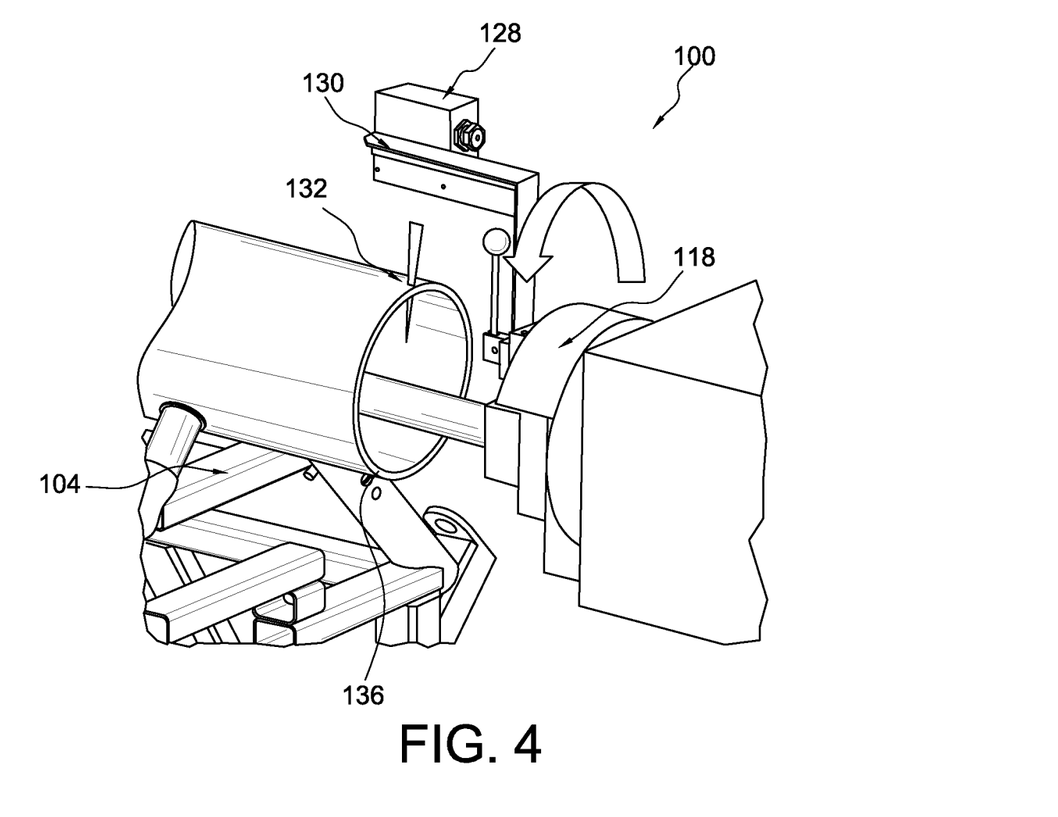
FIG. 4 is another detailed partial isometric view of the field machining system shown in FIG. 1A.

Once the laser displacement sensor 128 is mounted on the spindle 118, an automated measuring routine or application can be initiated in which the system 100 moves the spindle 118 to bring the laser displacement sensor 128 to a first measurement plane 132 as shown in FIG. 4. This can include receiving user input specifying the initiation of the automated measuring/alignment routine by the system 100. This can include receiving feedback from the laser displacement sensor 128 or any other feedback or input. The positioning module 105 can output one or more drive instructions via the I/O module 103 to one or more drive systems of the system 100 without human intervention (e.g., without input from an operator).

Automatically and without human intervention, the system 100 may move the spindle 118 in accordance with the drive instructions (e.g., move the spindle 118 along the Z-axis) to bring the laser displacement sensor 128 to the first measurement plane 132. The first measurement plane 132 is generally in the X-Y plane and can be in any suitable location. If the end of the pipe 106 is really rough and/or includes slag, the first measurement plane 132 can be selectively located along a length the pipe 106 to avoid such issues at the end of the pipe 106. The first measurement plane 132 can be between about 0.2 inches and about 1 inch (e.g., about 0.5 inches) axially from the end face 136 of the pipe 106. In other embodiments, the first measurement plane 132 can be closer or further from the end face 136 of the pipe 106.

The laser displacement sensor 128 can be located radially in the first measurement plane 132 at any suitable distance from the pipe 106. For instance, the laser displacement sensor 128 can be positioned between about 1 inch and about 4 inches (e.g., about 2.5 inches) away from the outer surface of the pipe 106. It will be appreciated that the I/O module 103 can receive instructions from an operator to initiate one or more steps in the automated measuring routine rather than being automatically initiated by the control system.

With the laser displacement sensor 128 in the first measurement plane 132, the positioning module 105 can output one or more drive instructions to the drive system 126 (shown in FIG. 1) and the measuring module 107 can output one or more measurement instructions to the laser displacement sensor 128 via the I/O module 103. Automatically, the drive system 126 may rotate the spindle 118 in accordance with the drive instructions to rotate the laser displacement sensor 128 one revolution on the spindle 118 about the secured end of the pipe 106 in the first measurement plane 132. For instance, the drive system 126 may slowly rotate the spindle 118 one revolution about the secured end of the pipe 106 at about 10 RPM.

The drive system 126 can automatically circumferentially position the laser displacement sensor 128 about the pipe 106. It will be appreciated that this can be performed with greater accuracy than in the prior art and can occur in a field environment such as in an oil-field, on an oil rig, or the like.

The laser displacement sensor 128 is generally rotated around the pipe 106 along a circular path or an elliptical path with an eccentricity of 0. It will be appreciated that the laser displacement sensor 128 can be rotated more or less than one revolution around the secured end portion of the pipe 106.

Automatically and without human intervention, the laser displacement sensor 128 may measure or generate measurement data associated with the profile of the secured end of the pipe 106 in the first measurement plane 132 in accordance with the measurement instructions from the measuring module 107. One or more measurement signals can be output from the laser displacement sensor 128 to the I/O module 103. The measurement signals can include a first set of displacement or measurement data generated by the laser displacement sensor and associated with the first measurement plane 132. The measurement data can include angle, distance, and/or displacement measurements or any other appropriate information. In other embodiments, the measurement data can include distance or displacement measurements and the control system can associate angular information with the measurement data.

The control system 101 can store the first set of measurement data in the memory 111 and/or the processing module 109 can analyze and process the first set of measurement data to determine a theoretical or calculated center of the secured end of the pipe 106 in the first measurement plane 132.

Figure 5:
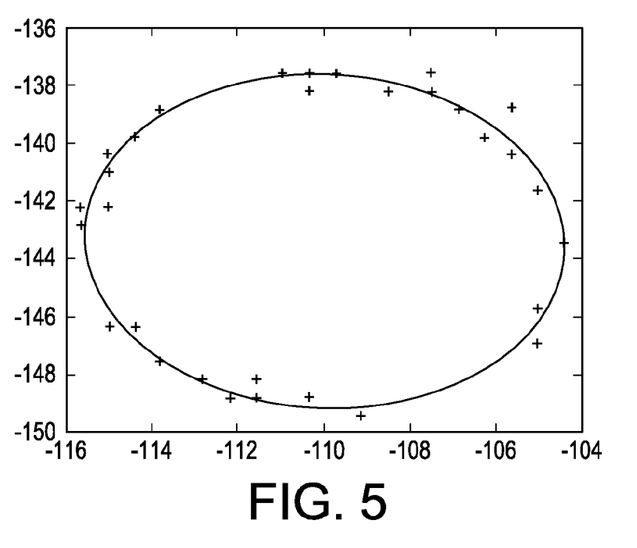
FIG. 5 is a graph depicting measured data collected during measurement of the pipe according to an embodiment.

The calculated center of the secured end of the pipe 106 in the first measurement plane 132 can be determined in any suitable manner. For example, the processing module 109 can determine a theoretical or calculated center of the secured end of the pipe 106 in the first measurement plane 132 by fitting an ellipse to the first set of measurement data and calculating a center of the ellipse that characterizes the calculated center in the first measurement plane 132. The processing module 109 can map data points from the first set of measurement data onto a coordinate system and the processing module 109 can fit an ellipse to those data points as shown in FIG. 5.

As shown, the fitted ellipse can have an eccentricity greater than zero and less than 1. The processing module 109 can use any suitable method to perform the ellipse fitting such as a best-fit algorithm, a direct least square method, a Ragul fit, a moment based ellipse fitting, an ellipse fitting by sampling, or another appropriate method or algorithm.

Once the ellipse is fitted, the processing module 109 can calculate the center of the fitted ellipse. This can be done in any suitable manner such as using parallel chords, orthogonal chords, the equation of the fitted ellipse, combinations thereof, or any other suitable method.

Figure 6:
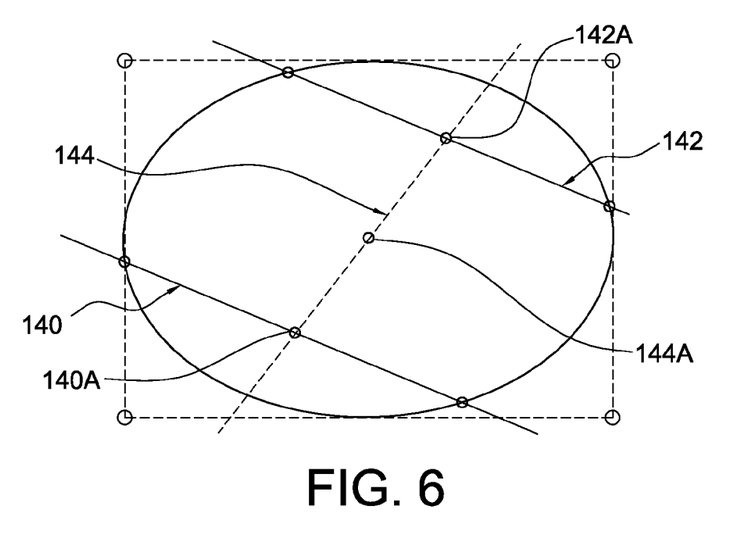
FIG. 6 is a graph depicting calculated data generated from the measured data shown in FIG. 5.

For example, as shown, in FIG. 6, the processing module 109 can use parallel chords and geometry to calculate the center of the fitted ellipse. First, the processing module 109 can generate, plot, and/or draw a set of parallel chords 140, 142 in the ellipse. The processing module 109 can then determine the midpoints 140A, 142A of the chords 140, 142. As shown, the midpoints 140A, 1142A, of the chords 140, 142 lie on a straight line. The processing module 109 can generate, plot, and/or draw a line 144 between the mid-points 140A, 142A of the chords. For instance, the processing module 109 can plot or draw the line 144, which can be displayed on a display by the I/O module 103.

The processing module 109 can then determine the middle 144A of the line 144. The middle 144A is the instantaneous center of the ellipse that can give or characterize a center of the secured end of the pipe 106 in the first measurement plane.

The processing module 109 can generate, plot, and/or draw as many sets of parallel chords and repeat the above method as needed to obtain a specific confidence level. For instance, the processing module 109 can generate, plot, and/or draw between 1 and 1000 sets of chords (e.g., about 12 sets of chords). The processing module 109 will get a mathematically unique center for each set of parallel chords drawn and analyzed.

With a data set of these mathematically unique center points, the processing module 109 can then use statistics to determine a theoretical center of the fitted ellipse, which, in turn, can provide a statistically significant center for the secured end of the pipe 106 in the first measurement plane 132. For instance, the processing module 109 can calculate the average of the data set of center points to achieve a specific confident average center point (e.g., 99.999%). In this manner, the processing module 109 can determine a theoretical or calculated center of the secured end of the pipe 106 in the first measurement plane 132. Such a method can be relatively tolerant of smaller alignment errors of the laser displacement sensor 128 with respect to the rotation axis of the spindle 118.

This computed and automatic measurement advantageously allows the system 100 to be used in a wider variety of environments where operating or setup conditions may not be ideal. It will be appreciated that the method described to calculate the center of the secured end of the pipe 106 in the first measurement plane 132 is exemplary only, as any method is possible.

Figure 7:
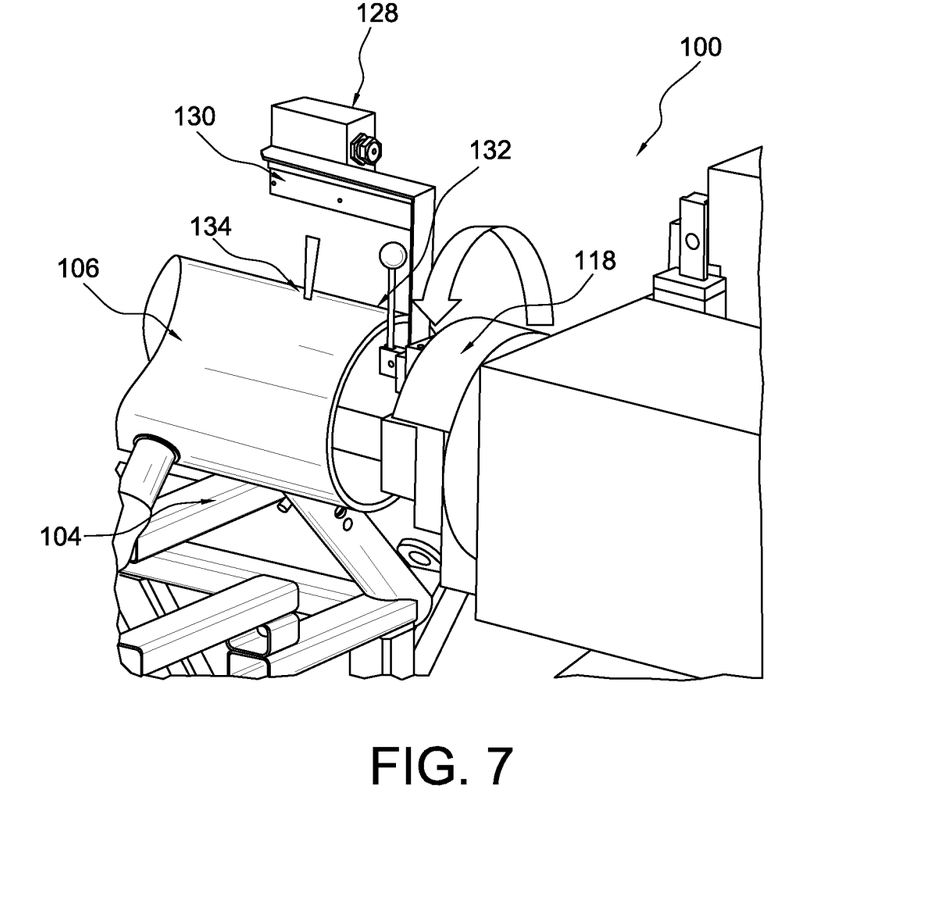
FIG. 7 is a partial isometric view of a field machining system according to an embodiment.

Referring now to FIG. 7, responsive to the measurement signals from the laser displacement sensor 128 in the first measurement plane 132 and/or rotation signals from the drive system 126, the positioning module 105 can output one or more linear or axial move or drive instructions to the drive system 124 (shown in FIG. 1) via the I/O module 103. Alternatively, the positioning module 105 can output one or drive instructions to the drive system 124 in response to receiving user input via the I/O module 103.

Automatically, the drive system 124 may drive the spindle system 114 in accordance with the drive instructions to move the spindle 118 from the first measurement plane 132 forward along the Z-Axis to bring the laser displacement sensor 128 to a second measurement plane 134. Like the first measurement plane 132, the second measurement plane 134 is generally in the X-Y plane. The linear distance between the first measurement plane 132 and the second measurement plane 134 can be any suitable distance. For instance, the linear distance can be between about 2 inches and about 10 inches (e.g., about 6 inches), between about 4 inches and about 8 inches, or any other suitable distance. The linear distance between the first measurement plane 132 and the second measurement plane 134 can be determined by the positioning module 105 or user input.

With the laser displacement sensor 128 in the second measurement plane 134, the positioning module 105 can then output one or more drive instructions to the drive system 126 (shown in FIG. 1) and the measuring module 107 can output one or more measurement instructions to the laser displacement sensor 128. Automatically, the drive system 126 may rotate the spindle 118 in accordance with the drive instructions to rotate the laser displacement sensor 128 on the spindle 118 one revolution about the pipe 106 in the second measurement plane 134. As noted above, the drive system 126 may rotate the spindle 118 in accordance with the drive instructions to rotate the laser displacement sensor 128 less or more than one revolution about the pipe 106 in the second measurement plane 134.

Automatically and without human intervention, the laser displacement sensor 128 may generate measurement data or measure the profile of the pipe 106 in the second measurement plane 134 in accordance with the measurement instructions. One or more measurement signals can be output from the laser displacement sensor 128 to the I/O module 103 that include a second set of displacement or measurement data associated with the second measurement plane 134.

The memory 111 can store the second set of measurement data and/or the processing module 109 can analyze and/or process the second set of measurement data to determine a calculated or theoretical center of the secured end of the pipe 106 in the second measurement plane 134.

The center of the secured end of the pipe 106 in the second measurement plane 134 can be calculated in the same or similar manner as in the first measurement plane 132. For instance, the processing module 109 can fit an ellipse to the second set of measurement data to get a statistically significant center for the secured end of the pipe 106 in the second measurement plane.

If the processing module 109 has already processed and/or analyzed the first and second sets of measurement data, the processing module 109 can then utilize the calculated center of the pipe 106 in the first measurement plane 132 and the calculated center of the pipe 106 in the second measurement plane 134 to determine a line between the two calculated center points that characterizes the axis or centerline of the secured end of the pipe 106. The determined axis of the secured end of the pipe 106 can provide the processing module 109 alignment information relating to the pipe 106. For instance, using the determined axis of the secured end of the pipe 106, the processing module 109 can determine the angular alignment of the determined axis of the pipe 106 relative to the axis of the spindle 118.

If the control system 101 has stored the first and/or second sets of measurement data in the memory 107, the processing module 109 can process and/or analyze the data sets to determine the two calculated center points and to determine a line or an equation for the line between the two center points that characterizes the axis of the secured end of the pipe 106. The processing module 109 can determine the center of the secured end of the pipe 106 by utilizing the calculated center from the first measurement plane 132 to represent the calculated center of the secured end of the pipe 106. The processing module 109 can determine the center of the secured end of the pipe 106 by averaging the calculated centers from the first measurement plane 132 and the second measurement plane 134 to represent the calculated center of the secured end of the pipe 106.

Thus, the system can use geometry, statistics, and/or a best-fit algorithm to accurately determine where the secured end of the pipe 106 is in space, rather having to iterate as in the prior art. This advantageously has the effect of being able to more accurately and quickly measure and/or align the system to a pipe. For instance, the laser displacement sensor 128 can be more precise than conventional measuring devices and the control system 101 can quickly analyze and generate large amounts of information to help ensure more accurate measurements.

The system 100 also eliminates the need for an operator to constantly monitor and record displacement data from a dial indicator, which, in turn, substantially reduces the time to align the system 100 to a pipe. Moreover, this automated approach is more consistent than in the prior art where dial indicators and/or operator errors can introduce inconsistencies in the measurement of the pipe. For instance, there is no longer the risk of an operator incorrectly reading the output from a dial indicator.

In addition, generally all pipe is deformed or non-circular to some extent (e.g., having an egg-like shape), thus, the actual center of the secured end of the pipe 106 is better approximated by an ellipse rather than by a circle. This has the effect of providing a more accurate estimate of the center of the secured end of the pipe 106, which in turn, can provide a much more accurate estimate of the axis or centerline of the pipe 106. Moreover, fitting an ellipse to the sets of measurement data involves solving for more variables than fitting a circle to the sets of measurement data. This advantageously has the effect of reducing the level of error in the calculations of the processing module 105.

In an embodiment, the position and center of rotation of the spindle 118 can be known or determined during the setup and commissioning of the system 100. With the determined axis or centerline of the secured end of the pipe 106, the control system 101 can initiate an automated alignment routine or application. For instance, the positioning module 105 can use one or more control applications or algorithms to direct one or more drive systems of the system 100 via the I/O module 103 to rotate the spindle 118 around the A-Axis and/or the B-Axis to bring the spindle 118 parallel with the secured end of the pipe 106. The positioning module 105 can direct one or more drive systems of the system 100 to translate the spindle 118 along the X-Axis and/or the Y-Axis to bring the center of the spindle 118 to the center of the pipe 106 such that the spindle 118 is parallel and concentric with the secured end of the pipe 106.

Alternatively, the positioning module 105 can use one or more control algorithms to direct the pipe support 104 to move the secured end of the pipe 106 such that the spindle 118 is parallel and concentric with the secured end of the pipe 106.

In other embodiments, the automated alignment routine or application can include moving the spindle 118 and the secured end of the pipe 106 such that the spindle 118 is parallel and concentric with the secured end of the pipe 106. This approach allows centering and parallelism of the system 100 relative to the pipe 106 to be determined with a single set of data. This also advantageously eliminates the need of an operator to jump back and forth between getting a machining system parallel with the pipe axis and getting the machining system on center with the secured end of the pipe, substantially reducing labor costs, setup time, and operator error.

Optionally, the automated measurement routine or application can be repeated one or more times by the control system to verify alignment of the spindle 118. The laser displacement sensor 128 can then be removed from the face of the spindle 118. As such, the system 100 is properly aligned and oriented to the pipe 106 and ready to perform a machining operation such as, for example, counter boring the ID of the pipe 106.

It will be appreciated that the system 100 is to be regarded as exemplary only, as any machining system is possible. For instance, while the system 100 is described including a single laser displacement sensor, in other embodiments, the system 100 can include two, three, or any other suitable number of laser displacement sensors. In other embodiments, the laser displacement sensor 128 may be mounted on the boring or cutting bar 122 or in any other suitable location.

In other embodiments, the system 100 can be configured to machine or counter bore the OD of the pipe 106. In yet other embodiments, the system 100 can fit other shapes to first and/or second sets of measurement data such as a parabola or another appropriate shape. In yet other embodiments, the system 100 can include a motion control platform allowing for controlled movement of the spindle system 114 and/or the spindle 118 in three-dimensional space.

In addition to the foregoing, one will appreciate that embodiments of the present disclosure can also be described in terms of flowcharts including one or more steps for accomplishing a particular result. For instance, the steps of FIGS. 8 and 9 and the corresponding text describe steps in a method for aligning a portable machining system with an end portion of a pipe. The steps in FIGS. 8 and 9 are described below with respect to the components and modules of FIGS. 1-7.

Figure 8:
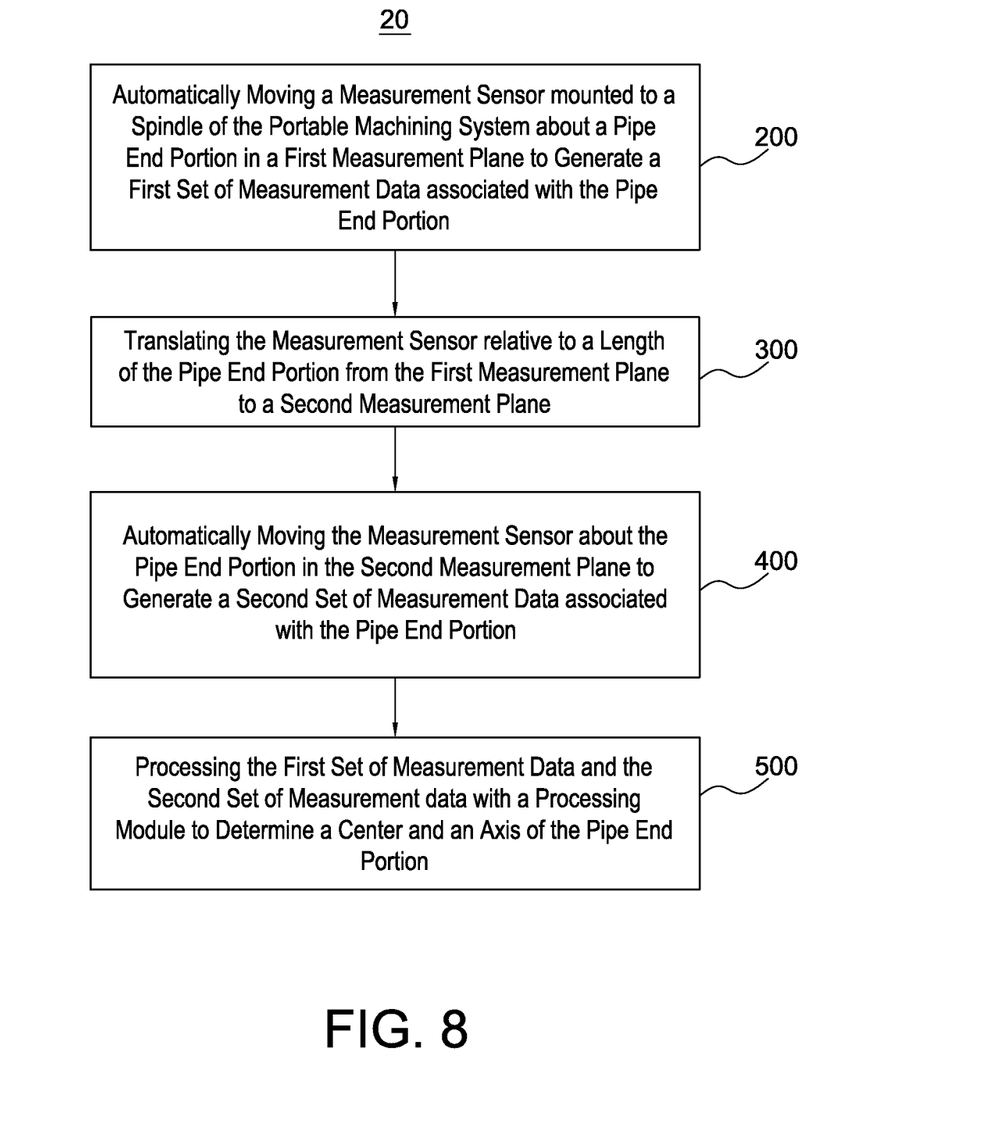
FIG. 8 is an overview of the steps in an embodiment of the pipe measurement method.
Figure 9:
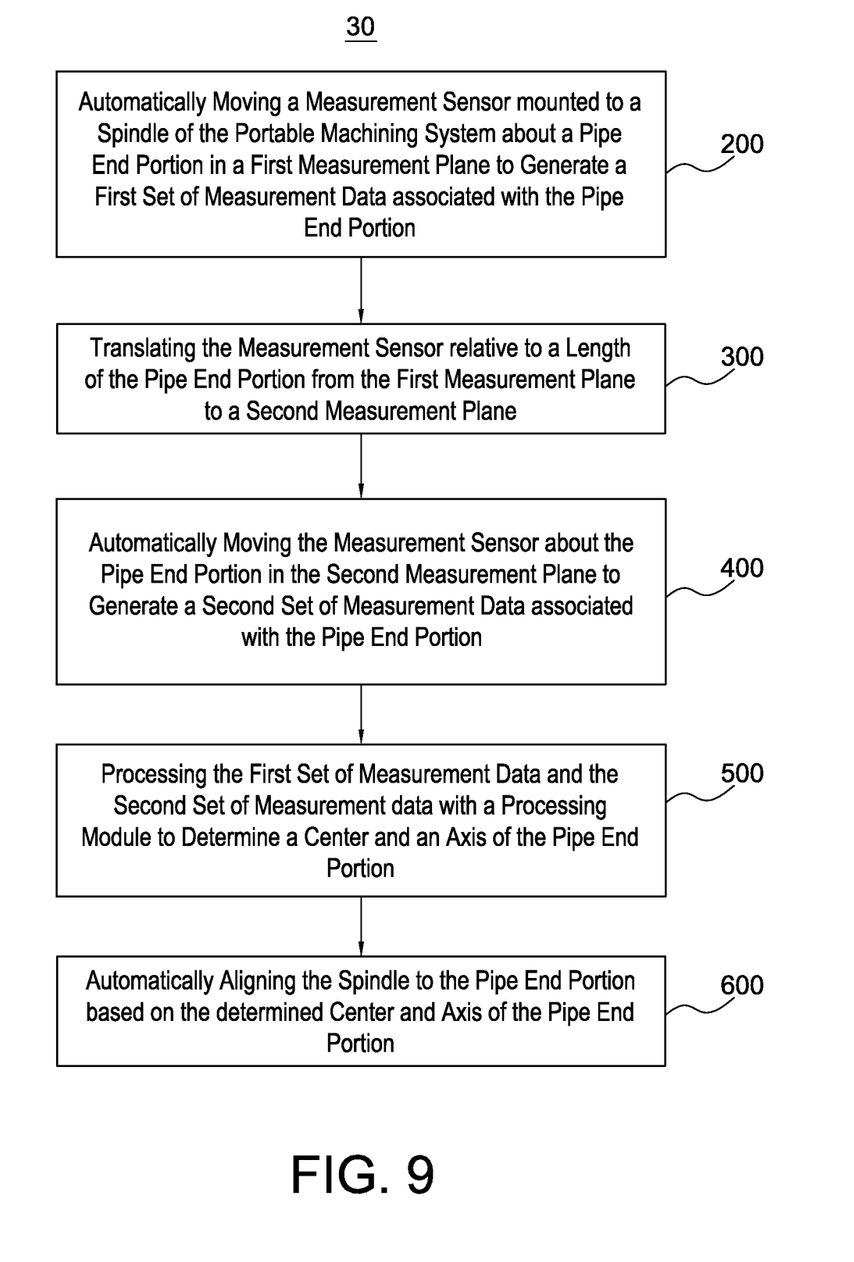
FIG. 9 is an overview of the steps in another embodiment of the pipe measurement method.

For instance, FIG. 8 illustrates a method 20 in accordance with the present disclosure for aligning a portable machining system with an end portion of a pipe includes step 200 of automatically moving a measurement sensor mounted to a spindle of the portable machining system about a pipe end portion in a first measurement plane to generate a first set of measurement data associated with the pipe end portion. Step 200 can include the control system sending drive and measurement instructions to the system. For example, FIGS. 2 and 4 and the accompanying description depict and describe the positioning module automatically directing the system to circumferentially position the measurement sensor about the pipe end portion. The measuring module directs the measurement sensor to measure the pipe to generate a first set of measurement data.

FIG. 8 also shows that the method can include the step 300 of translating the measurement sensor relative to a length of the pipe end portion from the first measurement plane to a second measurement plane. Step 300 can include the positioning module directing the system to automatically translate the measurement sensor along the pipe. For instance, FIGS. 4 and 7 and the accompanying description depict and describe the positioning module providing drive instructions to the drive system to move the measurement system from the first measurement plane to the second measurement plane.

Additionally, FIG. 8 shows that the method 20 can include a step 400 of automatically moving the measurement sensor about the pipe end portion in the second measurement plane to generate a second set of measurement data. Step 400 can include the control system sending drive and measurement instructions to the system to measure the pipe end portion in the second measurement plane. For example, FIG. 7 the accompanying description depict and describe the positioning module automatically directing the system to circumferentially position the measurement sensor about the pipe end portion. The measuring module directs the measurement sensor to measure the pipe, which, in turn, generates the second set of measurement data.

FIG. 8 also shows that the method 20 can include the step 500 of processing the first and second sets of measurement data with a processing module to determine a center and an axis of the pipe end portion. Step 500 can include fitting the first and second sets of measurement data to an ellipse. For instance, FIGS. 5 and 6 and the accompanying description depict and describe the processing module computing the center and axis of the pipe end portion.

As an additional example, FIG. 9 illustrates that the method 30 in accordance with the present disclosure for aligning a portable machining system with an end portion of a pipe includes steps 200, 300, 400, and 500. The method can further include a step 600 of automatically aligning the spindle to the pipe end portion based on the determined center and axis of the pipe end portion. Step 600 can include the control system initiating an automated alignment routine or application with the determined axis or center of the pipe. For instance, FIG. 8 and the accompanying description depict and describe the positioning module using control applications to direct the drive systems to bring the spindle parallel with the end portion of the pipe.

Accordingly, FIGS. 1-9 provide a number of components, schematics and mechanisms for automatically aligning a portable machining system to a pipe end. This has the effect of eliminating operator error and does not require extensive and specialized operator training, as in the prior art. This also advantageously is faster, more accurate, and more consistent than conventional systems and methods.

Many of the elements described in the disclosed embodiments may be implemented as modules. A module is defined here as an isolatable element that performs a defined function and has a defined interface to other elements. The modules described in this disclosure may be implemented in hardware, a combination of hardware and software, firmware, or a combination, all of which can be behaviorally equivalent. Modules may be implemented using computer hardware in combination with software routine(s) written in a computer language. It may be possible to implement modules using physical hardware that incorporates discrete or programmable analog and/or digital hardware. Examples of programmable hardware include computers, microcontrollers, microprocessors, application-specific integrated circuits, field programmable gate arrays, and complex programmable logic devices.

As noted above, the automated measurement and/or alignment routines or applications may be software embodied on a computer readable medium which when executed by a processor component of a computer device performs a sequence of steps. The application may be a mobile application or application software configured to run on smartphones, tablets computers, and/or other mobile devices.

Moreover, embodiments of the present disclosure may comprise or utilize a special-purpose or general-purpose computer system that includes computer hardware, such as, for example, one or more processors and system memory, as discussed in greater detail below. Embodiments within the scope of the present disclosure also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the disclosure can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the disclosure.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the disclosure may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof e.g., "comprise" and "comprises").

What is claimed is:

1. A method of aligning a portable machining system to a pipe end portion comprising:
    providing a portable machining system including a main spindle having a cutting bar and a measurement sensor radially spaced from the cutting bar on the main spindle;
    automatically rotating the measurement sensor with the main spindle about a pipe end portion in a first measurement plane to generate a first set of measurement data associated with the pipe end portion;
    translating the measurement sensor with the main spindle relative to a length of the pipe end portion from the first measurement plane to a second measurement plane that is separated from the first measurement plane by a linear distance;
    automatically rotating the measurement sensor with the main spindle about the pipe end portion in the second measurement plane to generate a second set of measurement data associated with the pipe end portion; and
    processing the first set of measurement data and the second set of measurement data with a processing module to determine a center and an axis of the pipe end portion.

2. The method of claim 1, further comprising automatically aligning a spindle of the portable machining system to the pipe end portion based on the determined center and axis of the pipe end portion.

3. The method of claim 1, wherein processing the first and second sets of measurement data includes fitting an ellipse to at least one of the first set of measurement data or the second set of measurement data.

4. The method of claim 3, wherein processing the first and second sets of measurement data includes determining a center of the fitted ellipse.

5. The method of claim 4, wherein the determined center of the ellipse is an average of a plurality of calculated center points of the fitted ellipse.

6. The method of claim 1, wherein processing the first and second sets of measurement data includes:
   fitting an ellipse to the first set of measurement data to determine a first center point in the first measurement plane;
   fitting an ellipse to the second set of measurement data to determine a second center point in the second measurement plane; and
   determining a line between the first center point and the second center point to provide the determined axis of the pipe end section.

7. The method of claim 1, wherein automatically moving the measurement sensor about the pipe end portion includes rotating the measurement sensor about the pipe end portion in a field environment.

8. The method of claim 1, wherein the linear distance between the first measurement plane and the second measurement plane is between about one inch and about ten inches.

9. The method of claim 1, wherein the measurement sensor comprises a laser displacement sensor having a non-contact configuration.

10. The method of claim 1, wherein the measurement sensor is removably mounted to the main spindle of the machining system.

11. The method of claim 10, wherein the measurement sensor is mounted on a bracket removably attached to the main spindle of the machining system.

12. The method of claim 11, wherein the machining system includes a cradle adapted to store the measurement sensor and the bracket when not in use.

13. The method of claim 1, wherein the measurement sensor is permanently mounted to a face of the main spindle.

14. The method of claim 1, wherein translating the measurement sensor relative to the pipe end portion includes translating the measurement sensor with the machining system.

15. The method of claim 1, wherein translating the measurement sensor relative to the pipe end portion includes translating the pipe end portion relative to the measurement sensor.

16. A portable machining system comprising:
   a base portion;
   a main spindle movable relative to the base portion, the main spindle including a spindle face and being rotatable about an axis of the main spindle;
   a cutting bar attached to the spindle face; and
   at least one measurement sensor removably attached to the spindle face and radially spaced from the cutting bar on the spindle face, the at least one measurement sensor arranged to generate measurement data associated with a pipe end portion by being rotated about the pine end portion in two or more different measurement planes separated from one another by a linear distance;
   a control system operably connected to the main spindle and the at least one measurement sensor, the control system operable to control the operation and movement of the spindle and the at least one measurement sensor, the control system being arranged to receive and process the measurement data generated by the at least one measurement sensor to determine a center and an axis of the pipe end portion.

17. The system of claim 16, further comprising a bracket removably attached to the spindle face, wherein the at least one measurement sensor is attached to the bracket.

18. The system of claim 16, wherein the measurement sensor comprises a laser displacement sensor having a non-contact configuration.

19. A method of aligning a portable machining system to a pipe end portion comprising:
   providing a portable machining system including a main spindle having a cutting bar and a measurement sensor radially spaced from the cutting bar on the main spindle;
   automatically rotating the measurement sensor with the main spindle about a pipe end portion in a first measurement plane to generate a first set of measurement data associated with the pipe end portion;
   translating the measurement sensor with the main spindle relative to a length of the pipe end portion from the first measurement plane to a second measurement plane that is separated from the first measurement plane by a linear distance;
   automatically rotating the measurement sensor with the main spindle about the pipe end portion in the second measurement plane to generate a second set of measurement data associated with the pipe end portion;
   processing the first set of measurement data and the second set of measurement data with a processing module associated with the machining system to determine a center and an axis of the pipe end portion; and
   automatically aligning the spindle to the pipe end portion based on the determined center and axis of the pipe end portion.

20. The method of claim 19, wherein the measurement sensor comprises a non-contact laser displacement sensor.

* * * * *